United States Patent [19]

Juster

[11] Patent Number: 5,143,341
[45] Date of Patent: Sep. 1, 1992

[54] RESILIENT KEYBOARD REST AND LAP ADAPTER

[76] Inventor: Robert W. Juster, 55 Valley View, Chappaqua, N.Y. 10514

[21] Appl. No.: 559,897

[22] Filed: Jul. 30, 1990

[51] Int. Cl.⁵ .............................................. A47B 97/04
[52] U.S. Cl. .................................... 248/444; 248/118
[58] Field of Search ................... 248/118, 118.1, 444, 248/918, 923, 633; 108/43, 90, 25

[56] References Cited

U.S. PATENT DOCUMENTS

| | | | |
|---|---|---|---|
| 3,407,757 | 10/1968 | Warner | 108/43 |
| 4,052,944 | 10/1977 | Jennings | 108/43 |
| 4,235,472 | 11/1980 | Sparks et al. | 108/43 X |
| 4,273,213 | 6/1981 | Munz | 248/633 X |
| 4,482,063 | 11/1984 | Berke et al. | 248/118 X |
| 4,511,111 | 4/1985 | Godfrey et al. | 248/918 X |
| 4,700,634 | 10/1987 | Mills et al. | 248/444 X |
| 4,765,583 | 8/1988 | Tenner | 248/444 |
| 4,790,041 | 12/1988 | Shtull | 108/43 X |
| 4,807,538 | 2/1989 | Hoffman | 108/25 |
| 4,938,439 | 7/1990 | Fried et al. | 248/444 X |

FOREIGN PATENT DOCUMENTS

| | | | |
|---|---|---|---|
| 0731149 | 12/1942 | Fed. Rep. of Germany | 108/43 |
| 8201983 | 6/1982 | PCT Int'l Appl. | 248/444 |
| 0396671 | 9/1933 | United Kingdom | 248/633 |

OTHER PUBLICATIONS

Pansonic Advertisement for Portable PC CF-150B.
"PC Pillow" Advertisement, Dartek Value Products Catalog, p. 46C.
Cushion and Pillow and Wrist Support Advertisements, Young Office Products Catalog 1990, pp. 469 and 480.

Primary Examiner—J. Franklin Foss
Attorney, Agent, or Firm—Dority & Manning

[57] ABSTRACT

A keyboard rest is made of resilient material such as foam, and has a sloping top surface for proper keyboard positioning. A resilient palm rest is provided adjacent the base of a received keyboard and acts as a stop to keep the keyboard properly positioned. The resilient keyboard rest member may be attached to a lap adapter comprising a generally rectangular base with a plurality of parallel flutes along its bottom, so as to provide air channels. Such structure limits lateral movement of the lap adapter when placed on the lap of a user, such as a computer operator or wheelchair patient. The alternating ribs and channels therebetween provide pressure dispersion while providing traction. The air channels provide air circulation. The keyboard rest member may be used without the lap adapter for use directly on a desktop or similar flat surface. Either embodiment provides enhanced ergonomic characteristics for the prevention of repetitive motion injuries and cumulative trauma disorders by reducing a user's physical stress of interacting with a keyboard or similar object.

15 Claims, 2 Drawing Sheets

RESILIENT KEYBOARD REST AND LAP ADAPTER

BACKGROUND OF THE INVENTION

The present invention generally concerns improved ergonomic conditions for seated persons (for example, such as keyboard operators or wheelchair patients), and more particularly concerns improved devices for support of a keyboard or the like on either a desktop surface or a user's lap so as to prevent repetitive motion injuries and cumulative trauma disorders for such users.

The literal explosion of computer applications in the workplace has resulted in the creation of numerous jobs which require keyboard operations. For example, certain data entry occupations may routinely require the keyboard operator to make ten thousand keystrokes or more per hour. Additionally, automated monitoring of a worker's output (i.e., keystroke rate) can create a considerably stressful work environment.

Routine exposures to such work environments has led to various occupational diseases which did not heretofore exist. Many of such diseases are generically referred to as repetitive motion injuries (RMI). One example is a syndrome referred to as carpal tunnel syndrome (CTS), a nerve disorder which is characterized by inflamed tendons in the hands. Symptoms include numbness and tingling fingers, the loss of feeling, and the loss of strength in one's hands or arms. Early treatments may include rest, job changes, wrist splints that prevent unnatural movements, or application of pain killers, such as cortisone. In advanced cases, corrective surgery on the ligament or nerves may be required to alleviate the acute pain in the hands caused by pressure on the nerve that runs through the bone tunnel in the wrist. Such pressure can occur from various inflammations brought on by repetitive (even though relatively small) traumas.

Recently, repetitive strain injuries replaced skin diseases as the leading cause of occupational illnesses in the United States according to the National Institute for Occupational Safety and Health. In 1987, almost seventy-three thousand (73,000) cases were reported, representing 38 percent of all cases. The problem is widespread, and can strike other industries such as the auto industry where a worker might operate a vibrating air gun or other device which can result in various cumulative trauma disorders.

One response from the field of ergonomics (i.e., human engineering) to such conditions has generally been to alter and hopefully improve furniture to be used by operators of personal computer equipment. For example, a video display terminal might be carried on a movable arm for maximum flexibility in its positioning. Additionally, some local areas have sought to legislate standards for workplace environments so as to lessen the occurrence of RMI/CTS and other so-called "video display terminal diseases."

SUMMARY OF THE INVENTION

The present invention recognizes and addresses various of the foregoing problems, and others, concerning keyboard and similar operations. Thus, broadly speaking, one principal object of this invention is to improve ergonomic operating conditions for a computer operator or similar occupation. More particularly, a main concern is improved keyboard operations for the prevention of repetitive motion injuries and cumulative trauma disorders, such as CTS and others.

It is another present object to provide improved operator ergonomics for either desktop or laptop operations.

Another general object of the present invention is to provide a device for use with a computer keyboard or similar article which provides the foregoing advantages to even the casual computer operator, such as in the home office, college dorm, or health-care marketplace.

In addition, it is a present general object to provide a lap adapter unit which has many applications, such as for assisting the wheelchair disabled, as well as the other above-described users. More particularly it is an object to provide such a lap adapter which may be used as a platform for mounting other accessories, of which a keyboard rest could be a primary option.

It is a further general present object to improve computer operator ergonomics generally, such as by permitting an operator to utilize a lap keyboard placement for properly distancing themselves from potential harmful effects of magnetic radiation from a video display terminal.

Still further, it is presently desired to achieve the foregoing objectives by providing devices which are relatively lightweight (particularly as to laptop users) and relatively inexpensive to manufacture to permit their widespread use.

Additional objects and advantages of the invention are set forth, or will be apparent to those of ordinary skill in the art, from the detailed description which follows. Also, it should be appreciated that modifications and variations to the specifically illustrated and discussed features hereof may be practiced in various embodiments and uses of this invention without departing from the spirit and scope thereof, by virtue of present reference thereto. Such variations may include, but are not limited to, substitution of equivalent means, features, or materials for those shown or discussed, and the functional or positional reversal of various parts or features, or the like.

Still further, it is to be understood that different embodiments, as well as different presently preferred embodiments, of this invention may include various combinations of presently disclosed features, or their equivalents (including combinations thereof not expressly shown or stated). One exemplary such embodiment of the present invention relates to a device for use for the computer keyboard or similar article to reduce physical stress on a user of such keyboard. Such device preferably comprises a main body of resilient material having an upper support surface with a first area adapted for receiving and supporting a computer keyboard or the like at a predetermined angle relative to the user. The upper support surface preferably also has a second area adjacent the first area and situated generally along an edge of the main body. The second area is adapted for resilient engagement with the palms and wrists of a user operating a computer keyboard received on the first area. With such a device, the user's physical stress of interacting with such keyboard is reduced for the prevention of repetitive motion injuries and cumulative trauma disorders.

Another present exemplary embodiment concerns an apparatus for the prevention of repetitive motion injuries to an operator of a computer keyboard or similar device. The apparatus preferably comprises in combination a keyboard rest means and a lap adapter means.

Such keyboard rest means preferably comprises a first resilient member having a first upper surface adapted for receiving and supporting a computer keyboard or similar device thereon, and having a second upper surface adapted for engaging the operator's palms and wrists. Such lap adapter means preferably comprises a second resilient member operatively associated with the keyboard rest means for supporting same. The second resilient member has a first lower surface adapted for interacting with and being received on the lap of the operator.

Yet another construction comprising a present exemplary embodiment includes a keyboard rest apparatus for operator lap use. Such apparatus comprises a generally elongated, rectangular member of resilient material, having an upper surface including a keyboard engagement region adapted for supporting a keyboard thereon at a predetermined angle, and including a resilient wrist engagement region formed along one edge of the keyboard engagement region. Such member further has a lower surface adapted for resting on the operator's lap with a longitudinal axis of the member situated generally across such operator's lap.

Still another present exemplary embodiment of this invention concerns a lap adapter apparatus for use by a seated person such as a computer operator or wheelchair patient. Such apparatus comprises a generally rectangular body of resilient material, having a greater dimension along its longitudinal axis than its dimension in a direction perpendicular to such axis. Such body further has respective first and second engagement surfaces on opposite sides thereof, with the first engagement surface being substantially planar for receiving and supporting objects to be used by a seated person. The second engagement surface preferably is adapted for resting on the lap of such seated person, and provided with traction means for limiting the amount of movement of the apparatus laterally relative to such person's lap.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended Figures, in which.

Figure 1:
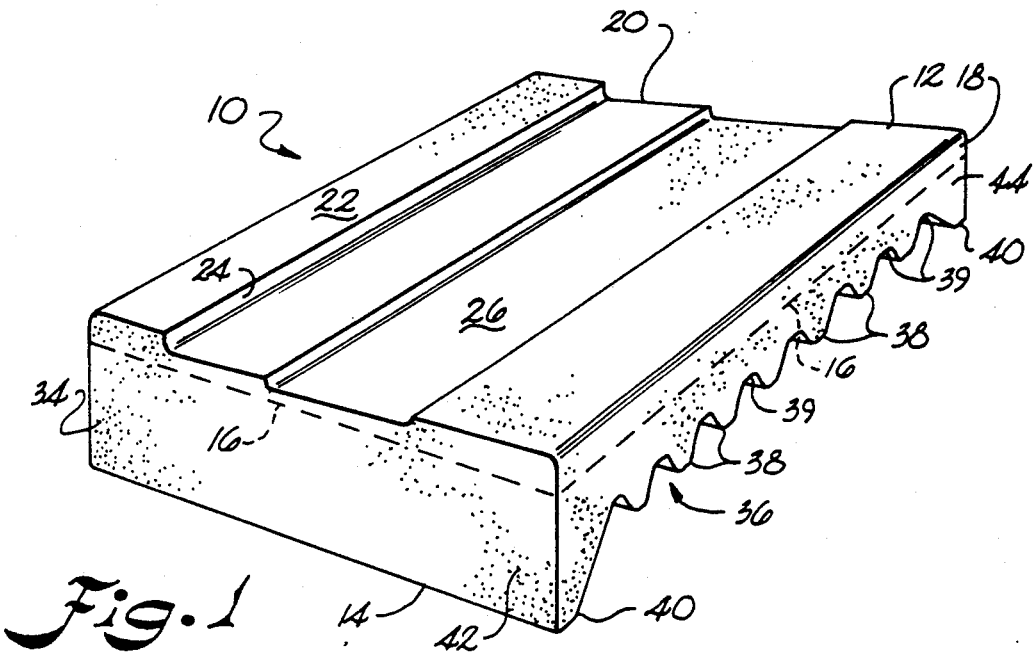
FIG. 1 is a generally top and side perspective view of exemplary keyboard rest means in accordance with this invention combined with present exemplary lap adapter means, such combination further comprising an exemplary embodiment of this invention.

Repeat use of reference characters throughout the present specification and appended drawings is intended to represent same or analogous features or elements of the invention.

DETAILED DESCRIPTION OF THE PREFERRED EMBODIMENTS

Figure 2:
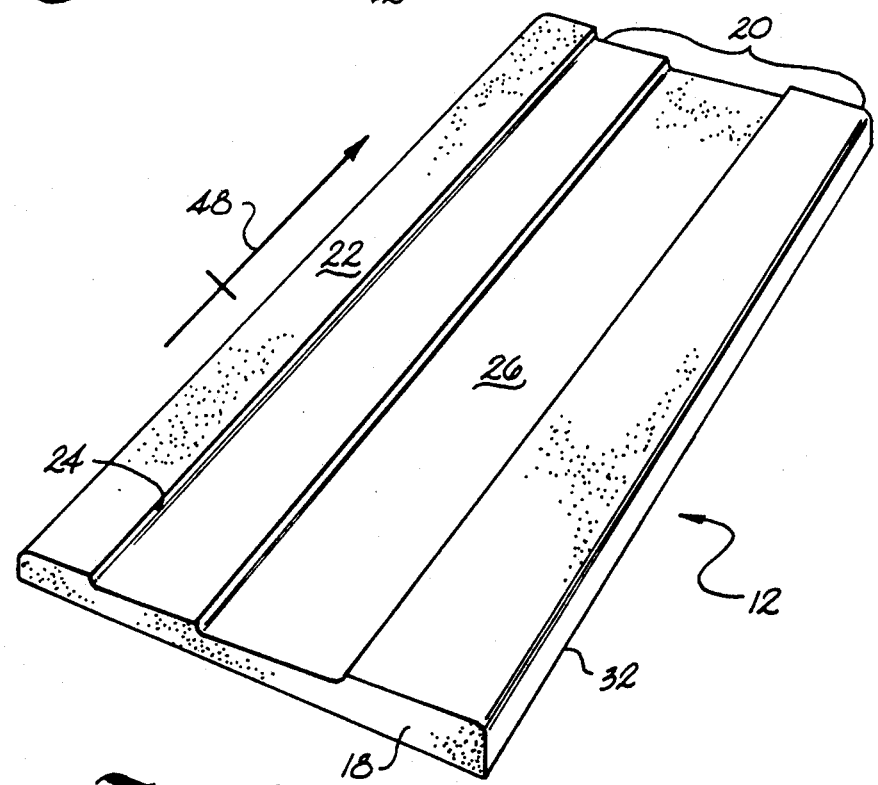
FIG. 2 is a generally top perspective view of present exemplary keyboard rest means, as represented in FIG. 1.

FIG. 1 is a generally side and top perspective view of in effect three separate embodiments of the present invention. The apparatus 10 of FIG. 1 comprises a present apparatus for the prevention of repetitive motion injuries to an operator of a computer keyboard or similar device. At the same time, such apparatus comprises a combination of keyboard rest means 12 in accordance with this invention and lap adapter means 14 in accordance with this invention. Preferably, apparatus 10 is formed by a combination of devices 12 and 14, as illustrated in FIG. 1 by the joinder of such separate means at dotted lines 16. Planar surfaces on each of the respective members 12 and 14 may be affixed (removably or not) to one another by glue, cement, Velcro, snaps, or other equivalent means. When separated, as represented in FIGS. 2 and 4, keyboard rest means 12 may be used in conjunction with a desktop arrangement, or with any other generally flat work space. When used in combination with lap adapter means 14, it may be directly supported on the lap of an operator, as represented in present FIG. 3.

Referring collectively to FIGS. 1 and 2, the keyboard rest means comprises a first resilient member generally 18 having a first upper surface or first area generally 20 adapted for receiving and supporting a computer keyboard or other similar device thereon. A second area or second upper surface 22 is formed generally adjacent the first area and situated generally along an edge of the main body 18. Such second area 22 is adapted for resilient engagement with the palms and wrists of a user operating a computer keyboard received on first area 20.

As illustrated in both FIGS. 1 and 2, the upper surface of second area 22 is generally raised relative to the adjacent portion of the first area 20. Also, first area 20 is at least slightly inclined towards the base of second area 22 so that a predetermined angle for a computer keyboard or the like received on such surface is established relative to the user. Since the inclination is towards the wrist or palm support area 22, the computer keyboard is generally inclined towards the operator. The precise angle of inclination may be varied in different embodiments, so as to accommodate specific needs or desires.

A junction 24 is formed between the first and second areas 20 and 22. Such forms stop means for desirably maintaining the position of a keyboard received on area 20 of the upper support surface. In other words, when a lower edge of a keyboard is received against junction 24, the wrists and palms of the keyboard operator will be positioned directly above area 22.

The upper support surface of main body 18, particularly the first area 20 thereof, preferably further includes a relatively recessed planar region 26 adapted for receiving a member such as a label or the like with printed subject matter thereon. Such may comprise an advertising logo or similar. Such recessed area also forms a channel 28 (see FIGS. 3 and 4) for the passage of data or power wires through such channel beneath a keyboard 30 received on such device in accordance with this invention.

Keyboard rest means 12 also preferably has a generally planar lower support surface 32 (see FIGS. 2 and 4) to facilitate support thereof on a flat surface such as a desktop or an upper planar surface of lap adapter means 14.

Preferably keyboard rest means 12 comprises a resilient material, such as a foamed material. A range of densities may be practiced, with foam generally in a density range of about 1.6 to 2.0 pounds per cubic foot being preferred. Specific foam materials are well known to those of ordinary skill in the art, and need not be discussed in greater detail for an adequate understanding of this invention.

Lap adapter means 14 generally comprises a second resilient member 34 which likewise preferably is a foamed material (such as generally in a preferred range of densities of about 1.6 to about 2.0 pounds per cubic foot). Such second resilient member has a first lower surface 36 generally adapted for interacting with and being receiving on the lap of an operator (see FIG. 3). Such lap adapter means also has an upper engagement surface on a side thereof generally opposite first lower surface 36. As discussed above, such upper engagement surface is preferably planar for joining with planar lower surface 32 of keyboard rest means 12 (see also dotted line junction 16 of FIG. 1). When so combined as illustrated in FIG. 1, lap adapter means 14 specifically is used to support keyboard rest means 12.

Lower surface 36 of lap adapter means 14 preferably integrally defines therein traction means for limiting movement of the apparatus laterally relative to the lap of the operator. Such traction means may comprise for example a plurality of raised ribs 38 with air circulating channels 39 therebetween. Because such fluting is formed integrally in resilient material, the alternating rib and channel arrangement provides pressure dispersion relative a user's lap.

In addition, the end ribs 40 adjacent lateral ends 42 and 44 of resilient body 34 are generally larger than the other of ribs 38. Such added size helps limit the side or lateral motion of means 14 or apparatus 10 relative to the lap of an operator. In addition, sides 42 and 44 may be slightly tapered outwardly towards surface 36 for contributing to such minimizing of side motion.

As discussed above, FIGS. 3 and 4 illustrate preferred uses of various of the presently preferred exemplary embodiments. Though no separate illustration is provided of lap adapter means 14 used by itself, those of ordinary skill in the art will appreciate that such lap adapter means may be used in a variety of manners separated from keyboard rest means 12. For example, a wheelchair patient could make use of such a device as a platform for numerous activities.

Figure 3:
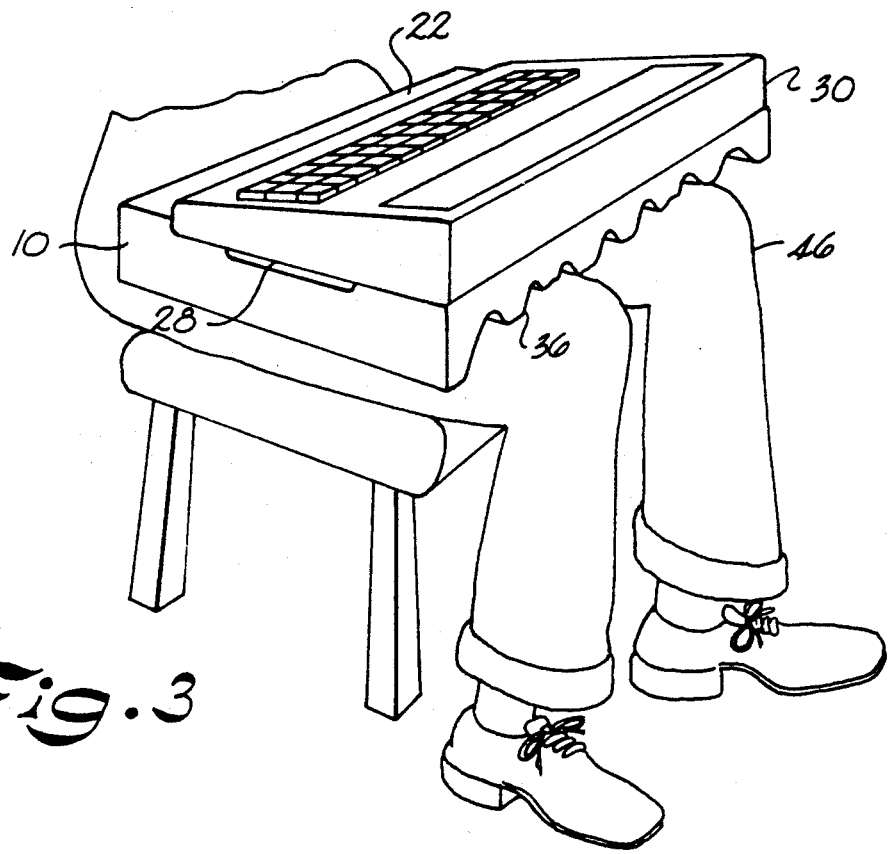
FIG. 3 is a generally perspective view of the exemplary embodiment of present FIG. 1, during laptop use of same with an exemplary conventional keyboard device.
Figure 4:
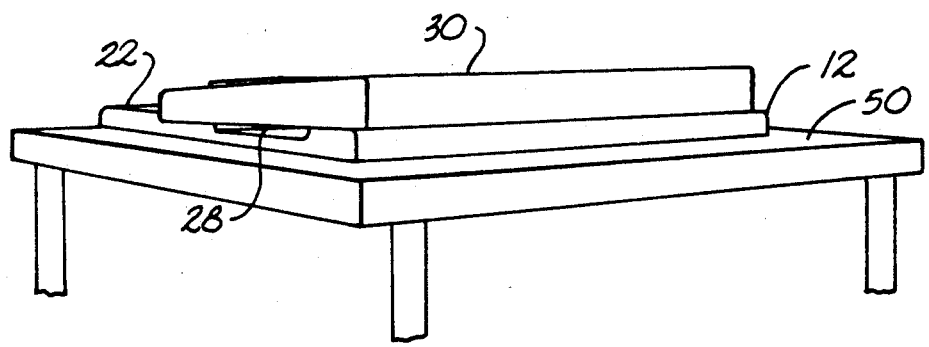
FIG. 4 is a generally perspective view of the exemplary keyboard rest means embodiment of present FIG. 2, during desktop use thereof with an exemplary conventional keyboard device.

FIG. 3 illustrates a preferred apparatus 10 comprising keyboard rest means 12 and lap adapter means 14 combined (as in FIG. 1 generally). A seated operator represented by reference character 46 generally receives the lower surface 36 of apparatus 10 across his or her lap. As illustrated, such apparatus (and each of the respective components 12 and 14 thereof) are generally rectangular and have a longitudinal axis 48 (see FIG. 2) having a greater dimension along such longitudinal axis than the dimension thereof in a direction perpendicular to such axis. As illustrated in FIG. 3, apparatus 10 is preferably situated so as to have its longitudinal axis generally across the lap of operator 46. In such position, a keyboard 30 (a typical conventional keyboard is generically represented in present FIG. 3) may be received on the upper support surface of apparatus 10. As discussed above, a channel 28 may remain for the passage of data or power wires from the keyboard 30, while an exposed and preferably raised area 22 along the base of the keyboard provides for resilient engagement with the wrists or palms of the operator.

FIG. 4 illustrates a representative conventional desktop 50 which is generally planar and in receipt of keyboard rest means 12 thereon. Keyboard 30 may again be received on the upper surface of such means 12, with a channel 28 formed between such keyboard and means 12, and with again exposed and preferably raised region 22 providing resilient engagement of the wrists and palms of an operator.

Those of ordinary skill in the art will appreciate that various modifications and variations to the foregoing exemplary embodiments may be practiced. For example, foam of various types may be provided, though foam with characteristic clinging or nonskid action on most surfaces is preferred. Such foam constructions generally permit achievement of the relatively low weight and low manufacturing expense objectives mentioned above. Such features permit various uses such as on airlines, or as a disposable or premium item for use at a hotel or other portable/temporary office arrangement.

Likewise, specific embodiments of the present invention are not limited to exact dimensions. However, for example, keyboard rest means may preferably be in a range of 19 to 23 inches along its longitudinal axis 48. As an example of other preferred dimensions, the lateral width of the resilient wrist engagement area 22 is preferably about 2 inches, while the lateral width of surface 20 is preferably about 8 inches. The stop means formed between the juncture of such two areas is preferably about $\frac{1}{2}$ of an inch tall.

With reference to the preferred undersurface 36 of lap adapter means 14, the depth of channels 39 formed betweens ribs 38 is preferably about 1 inch, while the total depth of sides 42 and 44 thereof is preferably about $2\frac{1}{2}$ to 3 inches.

Those of ordinary skill in the art will appreciate that further alternative features may be practiced to good advantage in combination with those described above. For example, charcoal colored foam may be selected so that the product will not show dirt or discoloring from ozone exposure. Also, the pieces themselves may be used as an integral part of computer packaging for shipment of a computer keyboard or the like to a particular office, with subsequent use thereof as described above. Additional features may also be provided for a specific embodiments or uses. For example, in connection with use for the wheelchair disabled, Velcro fasteners may be attached to the sides of the lap adapter with a strap going under the thigh of the wheelchair patient to make for a better attachment area during transport of such patient. Disposable plastic coverings may be provided, particularly for example with lap use versions, to prevent spoilage and/or damage due to spilled beverages or the like.

All such modifications and variations are intended to come within the spirit and scope of the present invention which is set forth more particularly in the appended claims. Similarly, the foregoing description is intended by way of example only, and is not intended as limiting the present invention.

What is claimed is:

1. A device for use with a computer keyboard or similar article to reduce physical stress on a user of such keyboard, said device comprising a main body of foamed resilient material having an upper support surface with a first area adapted for receiving and supporting a computer keyboard or the like at a predetermined angle relative to the user, and with a second area adjacent said first area and situated generally along an edge of said main body, said second area being adapted for resilient engagement with the palms and wrists of a user operating a computer keyboard received on said first area, so that a user's physical stress of interacting with such keyboard is reduced for the prevention of repetitive motion injuries and cumulative trauma disorders; wherein said second area is generally raised relative to the adjacent portion of said first area, and said first area is inclined towards the base of said second area for collectively forming therewith stop means for maintaining the position of a keyboard received on said upper support surface, said main body is generally rectangular, said device further includes lap adapter means, operatively forming a lower support surface of said main body, for supporting said device on the lap of a user; and further wherein said lap adapter means comprises foamed resilient material having a lower engagement surface adapted for engagement with a user's lap and integrally defining therein traction means for limiting movement of said device laterally relative to the user's lap, said traction means comprising a row of a plurality of ribs of resilient material with channels defined therebetween.

2. A device as in claim 1, wherein said first area includes a recessed planar region adapted for receiving a member with printed subject matter thereon, and wherein such recessed area forms a channel relative the remainder of said first area for the passage of wires through such channel beneath a keyboard received on said device.

3. A device as in claim 1, wherein ribs at each end of said row are relatively larger than the other of said ribs.

4. Apparatus for the prevention of repetitive motion injuries to an operator of a computer keyboard or similar device, said apparatus comprising:

keyboard rest means comprising a first foamed resilient member having a first upper surface adapted for receiving and supporting a computer keyboard or similar device thereon, and having a second upper surface adapted for engaging the operator's palms and wrists; and lap adapter means comprising a second foamed resilient member operatively associated with said keyboard rest means for supporting same, said second resilient member having a first lower surface adapted for interacting with and being received on the lap of the operator; so that the physical stress level is reduced for the operator of a computer keyboard received on said keyboard rest means, with the resulting prevention of repetitive motion injuries and cumulative trauma disorders; wherein said keyboard rest means further has a lower engagement surface on a side thereof generally opposite said first and second upper surfaces thereof;

said lap adapter means further has an upper engagement surface on a side thereof generally opposite said first lower surface thereof; and said respective engagement surfaces of said keyboard rest means and said lap adapter means are secured to one another; and further wherein said first upper surface of said keyboard rest means is generally inclined at a predetermined angle towards said second upper surface thereof;

said second upper surface of said keyboard rest means is generally raised relative to the adjacent portion of said first upper surface thereof, so that the junction of said first and second upper surfaces form stop means for maintaining the position of a keyboard received on said keyboard rest means;

said lap adapter means first lower surface includes integrally formed therein traction means for limiting movement of said apparatus laterally relative to the lap of the operator; and said traction means comprise a plurality of raised ribs with air circulating channels therebetween, said ribs also providing pressure dispersion relative the user's lap.

5. An apparatus as in claim 4, wherein ribs adjacent respective ends of said lap adapter means first lower surface are generally larger than the other of said ribs.

6. An apparatus as in claim 5, wherein sides of said second resilient member adjacent said first lower surface respective ends are generally tapered outwardly towards said first lower surface.

7. A keyboard rest apparatus, comprising a generally elongated, rectangular member of foamed resilient material, having an upper surface including a keyboard engagement region adapted for supporting a keyboard thereon at a predetermined angle, and including a resilient wrist engagement region formed along one edge of said keyboard engagement region, said member further having a lower surface adapted for resting on a support surface such as one of an operator's lap and a desk, wherein use of said apparatus reduces adverse cumulative effects of repetitive operator motions by reducing the operator's physical stress level; and further wherein said upper surface keyboard engagement region is generally inclined towards said wrist engagement region thereof, so that a keyboard received on said upper surface will be tilted towards the operator, and said wrist engagement region relatively projects generally above the portion of said upper surface adjacent thereto, so that the base of said wrist engagement region and said inclined upper surface keyboard engagement region cooperate to form stop means for maintaining desired positioning of a keyboard on said upper surface; and wherein said upper surface keyboard engagement region includes a recessed area forming a channel relative the remainder of said upper surface keyboard engagement region for the passage of wires through such channel beneath a keyboard received on said device.

8. A keyboard rest apparatus as in claim 7, wherein said lower surface further includes alternating raised and lowered areas formed in said resilient material to provide pressure dispersion for said member when resting on an operator's lap, to form air channels for improved air circulation, and to form traction means for reducing movement of said apparatus laterally relative to such operator's lap.

9. A keyboard rest apparatus as in claim 8, wherein raised areas located on each longitudinal end of said lower surface are generally larger than the remainder of said raised areas, for keeping said apparatus seated on an operator's lap.

10. A keyboard rest apparatus as in claim 7, wherein said member is comprised of two separate bodies of foamed material such that said upper surface is formed on one of such bodies, and said lower surface is formed on the other of such bodies.

11. A lap adapter apparatus for use by a seated person such as a computer operator or wheelchair patient, said apparatus comprising a generally rectangular body of foamed resilient material, said body having a greater dimension along its longitudinal axis than its dimension in a direction perpendicular to such axis, said body further having respective first and second engagement surfaces on opposite sides thereof, with said first engagement surface being substantially planar for receiving and supporting objects to be used by a seated person, and with said second engagement surface being adapted for resting on the lap of such seated person, and provided with traction means for limiting the amount of movement of the apparatus laterally relative to such person's lap, wherein said traction means includes a plurality of alternating raised ribs and channels integrally formed in said resilient material with said ribs and channels aligned generally parallel to one another and generally perpendicular with said body longitudinal axis, said alternating rib and channel arrangement providing pressure dispersion on the seated person's lap while said channels provide air circulation relative thereto.

12. A lap adapter apparatus as in claim 11, wherein the longitudinal ends of said rectangular body are generally tapered outwardly from said first engagement surface towards said second engagement surface thereof, and ribs adjacent said longitudinal ends of said rectangular body are generally larger than the other of said ribs.

13. A lap adapter apparatus as in claim 11, further including keyboard rest means, comprising a resilient body removably supported on said first engagement surface, for receiving and supporting a computer keyboard or similar device thereon, and for providing a resilient palm and wrist rest area for the seated person on whose lap said lap adapter apparatus second engagement surface is rested.

14. A lap adapter apparatus as in claim 13, wherein said keyboard rest means further includes a keyboard engagement region which in inclined at a predetermined angle towards said resilient palm and wrist rest area, and wherein said keyboard rest means further includes stop means for maintaining desired positioning of a keyboard thereon.

15. A lap adapter apparatus as in claim 11, wherein said foamed resilient material has a density preferably in a range generally from about 1.6 to 2.0 pounds per cubic foot.

* * * * *